(12) United States Patent
Aibester et al.

(10) Patent No.: US 12,425,352 B2
(45) Date of Patent: Sep. 23, 2025

(54) MICE-ELEPHANT AWARE SHARED BUFFER SCHEMA

(71) Applicant: MELLANOX TECHNOLOGIES, LTD., Yokneam (IL)

(72) Inventors: Niv Aibester, Herzliya (IL); Gil Levy, Hod-Hasharon (IL); Aviv Kfir, Nili (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/893,835

(22) Filed: Aug. 23, 2022

(65) Prior Publication Data
US 2024/0073151 A1    Feb. 29, 2024

(51) Int. Cl.
*H04L 47/62* (2022.01)
*H04L 43/0882* (2022.01)
*H04L 47/2441* (2022.01)
*H04L 47/80* (2022.01)
*H04L 49/103* (2022.01)

(52) U.S. Cl.
CPC ........ *H04L 47/621* (2013.01); *H04L 43/0882* (2013.01); *H04L 47/2441* (2013.01); *H04L 47/801* (2013.01); *H04L 49/103* (2013.01)

(58) Field of Classification Search
CPC ............... H04L 47/621; H04L 43/0882; H04L 47/2441; H04L 47/801; H04L 49/103
See application file for complete search history.

(56) References Cited

U.S. PATENT DOCUMENTS

| | | | |
|---|---|---|---|
| 6,501,733 B1 * | 12/2002 | Falco | H04L 47/824 370/429 |
| 7,221,656 B1 * | 5/2007 | Aweya | H04L 47/10 370/230.1 |
| 10,078,613 B1 * | 9/2018 | Ramey | G06F 13/4221 |
| 10,178,029 B2 | 1/2019 | Levy et al. | |
| 10,462,060 B2 | 10/2019 | Ruthstein et al. | |
| 10,476,794 B2 | 11/2019 | Levy et al. | |
| 10,476,803 B2 | 11/2019 | Shpiner et al. | |
| 10,498,612 B2 | 12/2019 | Levy et al. | |
| 10,601,714 B2 | 3/2020 | Srebro et al. | |
| 11,032,206 B2 | 6/2021 | Mula et al. | |
| 11,374,838 B1 | 6/2022 | Finkelshtein et al. | |
| 2005/0100009 A1 * | 5/2005 | Botvich | H04Q 11/0478 370/468 |

(Continued)

*Primary Examiner* — Joe Chacko
(74) *Attorney, Agent, or Firm* — Sheridan Ross P.C.

(57) ABSTRACT

A networking device and system are described, among other things. An illustrative system is disclosed to include a shared buffer and at least a flow controller. In some embodiments, the system and/or flow controller may be configured to measure a packet flow's bandwidth consumption of the shared buffer, assign a flow-type attribute to the packet flow based on the packet flow's bandwidth consumption of the shared buffer, select a shared buffer schema for the packet flow based on the flow-type attribute assigned to the packet flow, and apply the selected shared buffer schema to the packet flow. For example, the flow-type attribute assigned to the packet flow may comprise a mice flow state or an elephant flow state, and a reserve attribute may be assigned to the flow based on the packet flow being assigned the mice flow state or the elephant flow state.

20 Claims, 4 Drawing Sheets

(56) References Cited

U.S. PATENT DOCUMENTS

| | | |
|---|---|---|
| 2014/0254380 A1* | 9/2014 | Swenson ............... H04L 47/823 370/235 |
| 2015/0006486 A1* | 1/2015 | Lin .......................... G06F 3/061 707/634 |
| 2016/0080207 A1* | 3/2016 | Prakash ................. H04L 47/821 370/231 |
| 2018/0019947 A1 | 1/2018 | Shpiner et al. |
| 2018/0241677 A1* | 8/2018 | Srebro ................ H04L 47/6275 |
| 2019/0158414 A1* | 5/2019 | Navon .................... H04L 47/56 |
| 2022/0045972 A1* | 2/2022 | Aibester ................. H04L 47/10 |
| 2022/0075766 A1 | 3/2022 | Levy et al. |
| 2022/0255870 A1 | 8/2022 | Lo et al. |

\* cited by examiner

MICE-ELEPHANT AWARE SHARED BUFFER SCHEMA

FIELD OF THE DISCLOSURE

The present disclosure is generally directed to systems, methods, and devices for distributed computing and, in particular, toward assigning a shared buffer schema in a communication network.

BACKGROUND

Networking devices such as routers, switches, Network Interface Controllers (NICs), etc. normally include a packet processing subsystem that manages the traversal of packets across a multi-layered network or protocol stack. For example, the network devices may be used in networking systems, like datacenters, for routing data between endpoints. In some cases, the network devices may use distributed computing for processing packets and routing the corresponding data between endpoints. A distributed computing system may be defined as a system whose components are located on different networking devices, which communicate and coordinate actions by passing messages to one another.

Bandwidth management is often performed in routers or switches to avoid filling a communication link to capacity or overfilling the link. Filling or overfilling a communication link may result in network congestion, poor performance, packet delays, or packet loss. Especially in cloud architectures, the need for timely and reliable packet transmission is paramount.

BRIEF SUMMARY

Embodiments of the present disclosure aim to improve latency in a communication network that implements a distributed computing system.

Example aspects of the present disclosure include a system, comprising: a processor; and computer memory coupled to the processor, wherein the computer memory comprises instructions stored thereon that, when executed by the processor, enable the processor to: measure bandwidth consumption of a packet flow; based on the bandwidth consumption of the packet flow, assign a flow-type attribute to the packet flow; select a shared buffer schema for the packet flow based on the flow-type attribute assigned to the packet flow; and apply the selected shared buffer schema to the packet flow.

Any of the aspects herein, wherein the instructions, when executed by the processor, further enable the processor to: measure the bandwidth consumption of the packet flow at an ingress of a queue.

Any of the aspects herein, wherein the instructions, when executed by the processor, further enable the processor to: measure the bandwidth consumption of the packet flow at an egress of a queue.

Any of the aspects herein, wherein the bandwidth consumption of the packet flow is measured for at least one of a physical queue or a virtual queue.

Any of the aspects herein, wherein the bandwidth consumption of the packet flow is measured in bytes.

Any of the aspects herein, wherein the instructions, when executed by the processor, further enable the processor to: adjust a service class of the at least one of the physical queue and the virtual queue.

Any of the aspects herein, wherein the flow-type attribute assigned to the packet flow comprises a mice flow state or an elephant flow state and wherein a reserve attribute is assigned to the flow based on the packet flow being assigned the mice flow state or the elephant flow state.

Any of the aspects herein, wherein the packet flow is assigned a first amount of reserved buffer when the packet flow is assigned the mice flow state as the flow-type attribute and wherein the packet flow is assigned a second amount of reserved buffer when the packet flow is assigned the elephant flow state as the flow-type attribute.

Any of the aspects herein, wherein the mice flow state is assigned to the packet flow when the packet flow exhibits a first amount of burstiness and wherein the elephant flow state is assigned to the packet flow when the packet flow exhibits a second amount of burstiness that is less than the first amount of burstiness.

Additional example aspects of the present disclosure include a flow controller, comprising: one or more receiver circuits that receive a packet flow; one or more flow-type detection circuits that classify the packet flow between a mice flow state and an elephant flow state; and one or more resource allocation circuits that assign a resource allocation schema to the packet flow based on the classification assigned to the packet flow by the one or more flow-type detection circuits.

Any of the aspects herein, wherein the resource allocation schema comprises a shared-buffer schema, a lossy schema, a lossless schema, or a combination thereof.

Any of the aspects herein, wherein a different amount of reserved buffer is made available to the packet flow depending upon the classification assigned to the packet flow by the one or more flow-type detection circuits.

Any of the aspects herein, wherein the packet flow is allocated a smaller portion of the reserved buffer when classified with the mice flow state than would be allocated to the packet flow when classified with the elephant flow state.

Any of the aspects herein, wherein the mice flow state is assigned to the packet flow when the packet flow exhibits a first amount of burstiness and wherein the elephant flow state is assigned to the packet flow when the packet flow exhibits a second amount of burstiness that is less than the first amount of burstiness.

Any of the aspects herein, wherein the one or more flow-type detection circuits classify the packet flow based on a measured bandwidth consumed by the packet flow.

Any of the aspects herein, wherein the bandwidth consumed by the packet flow is measured at an ingress and/or egress of a buffer.

Additional example aspects of the present disclosure include a system, comprising: a shared buffer; and a flow controller that: measures a packet flow's bandwidth consumption of the shared buffer; based on the packet flow's bandwidth consumption of the shared buffer, assigns a flow-type attribute to the packet flow; selects a shared buffer schema for the packet flow based on the flow-type attribute assigned to the packet flow; and applies the selected shared buffer schema to the packet flow.

Any of the aspects herein, wherein the flow controller measures the packet flow's bandwidth consumption at one or both of a queue ingress and a queue egress.

Any of the aspects herein, wherein the queue comprises at least one of a physical queue or a virtual queue.

Any of the aspects herein, wherein the flow-type attribute assigned to the packet flow comprises a mice flow state or an elephant flow state and wherein a reserve attribute is assigned to the flow based on the packet flow being assigned the mice flow state or the elephant flow state.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
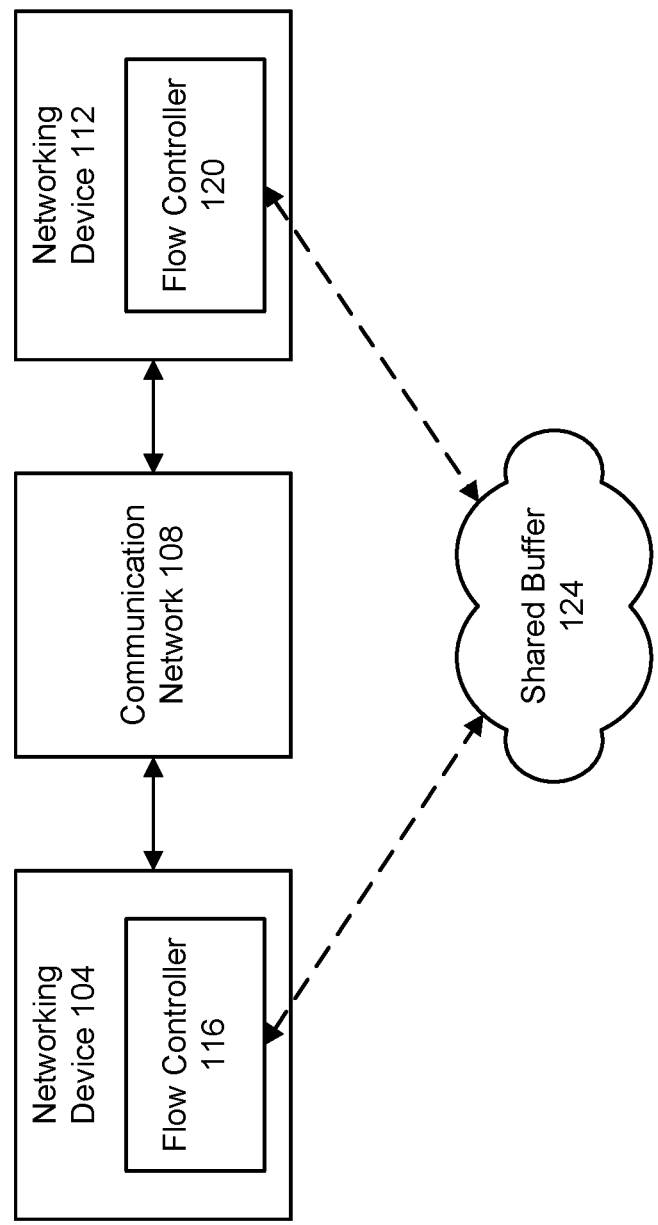
FIG. 1 illustrates a block diagram of a networking system according to at least one example embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Networking devices such as routers, switches, Network Interface Controllers (NICs), etc. normally include a packet processing subsystem that manages the traversal of packets across a multi-layered network or protocol stack. For example, the network devices may be used in networking systems, like datacenters, for routing data between endpoints.

Some computing systems may comprise thousands of nodes and/or networking devices interconnected by a communication network. In some cases, the network devices may use distributed computing for processing packets and routing the corresponding data between endpoints. A distributed computing system may be defined as a system whose components are located on different networking devices, which communicate and coordinate actions by passing messages to one another.

In some distributed computing networks and systems, data from one application (e.g., a first networking device, first node, first port, etc.) is wrapped into a packet and transmitted to another application (e.g., a second networking device, second node, second port, etc.). A packet includes application data and packet headers. In a traditional communication model, a client sends a request for data to a server. The server responds to the request and sends the data to the client. The client and the server acknowledge each other. The client processes the data and places the data in the packets, and the packets are stored in a buffer (e.g., of a NIC) until the host application retrieves the packet after a time popularly known as 'dequeue time.' In some examples, packets for each application may be multiplexed into a single stream. Additionally, a packet buffer management algorithm may determine whether to accept or reject a packet. The accepted packets are then placed into logical first-in-first-out (FIFO) queues, and each application may have its own queue in a packet buffer. The accepted packet remains in the buffer until the application retrieves the packet from the buffer. Once the buffer gets full, newly arrived packets may be rejected.

Forwarding traffic (e.g., packets, data, requests, etc.) through a networking device (e.g., a switch, NIC, port, networking device, etc.) may be based on buffering ingress traffic in input queues on ingress interfaces, forwarding the traffic across a fabric (e.g., network fabric, switch fabric, etc.) to output queues on egress interfaces, and then buffering traffic again on the output queues before transmitting the traffic to the next hop. The traditional method of queueing packets on an ingress port is storing traffic destined for different egress ports in the same input queue (e.g., a buffer).

A data buffer (or just "buffer") may refer to a region of a memory used to temporarily store data while the data is being moved from one place to another. In some examples, the data may be stored in a buffer as the data is retrieved from an input device and/or before the data is sent to an output device. For example, a buffer may be used when moving data between processes within a computer or between different nodes, networking devices, applications, etc., of a distributed computing network as described herein.

Buffers or shared buffer schemes can be implemented in any number of configurations. Regardless of configuration, the data stored in a data buffer may be stored on a physical storage medium. For example, the buffer may exist in a chip. All interfaces of the chip share the buffer of the chip, and all queues of an interface share the buffer of the interface. The buffer can be classified into the chip, interface, and queue levels. In some examples, a buffer (e.g., packet buffer) may include a large shared dual-ported memory. A majority of buffers may be implemented in software, which typically use the faster Random-Access Memory (RAM) to store temporary data, due to the much faster access time compared with hard disk drives. Buffers are typically used when there is a difference between the rate at which data is received and the rate at which the data can be processed or in the case that these rates are variable. In a distributed computing environment, a data buffer is often implemented in the form of a burst buffer that provides distributed buffering service.

In some embodiments, a distributed computing environment or network may employ a shared buffer that multiple networking devices of the distributed computing environment or network are allowed to access and use for buffering ingress and/or egress traffic. For example, successfully received packets by a network device (e.g., switch) are stored on a buffer (e.g., internal memory) from the time the packets are received until the time the packets are transmitted, where the buffer may be fully shared between all network devices that are part of the distributed computing environment or network and is hence called a shared buffer. That is, shared buffers may include a pool of buffer space (e.g., shared memory space) that the distributed computing environment or network can allocate dynamically across all of the corresponding networking devices (e.g., ports, applications, nodes, etc.) as memory space is needed.

In some embodiments, the distributed computing environment or network may configure a shared buffer pool allocation to the networking devices. For example, some buffer space may be reserved for dedicated ingress ports and/or egress ports, headroom buffers (e.g., buffers that help prevent packet loss on lossless flows), and other buffers. In some embodiments, a networking device may use the shared-buffer pool to absorb micro-burst congestion events after a corresponding dedicated-buffer-pool is exhausted. The shared pool threshold may be dynamically calculated based on a factor (e.g., sometimes called "alpha").

In some embodiments, any memory space not allocated to a global shared buffer pool may be added to a dedicated buffer pool for each networking device. Additionally or alternatively, the percentage of available (e.g., user-configurable) buffer space allocated to the global shared buffers may be configurable. Some configurations may allocate 100 percent of available buffer space to global shared buffers. Additionally or alternatively, ingress and egress shared buffer pools may be partitioned to allocate more buffers to the types of traffic a network predominantly carries, and fewer buffers to other traffic. For example, global shared memory space (e.g., shared buffer) may be allocated to different types of buffers to better support different mixes of network traffic. Although a networking device may be allocated or may reserve a portion of buffer space to ensure a minimum memory allocation for ports and queues, a system (e.g., the distributed computing environment or network) may be configured to use the rest of the buffer space to optimize buffer allocation for a particular mix of network traffic.

From the buffer space allocated to the shared buffer pool, space may be allocated to lossless buffers, lossless headroom buffers, and/or lossy buffers. Lossless buffers may represent a percentage of the shared buffer pool for all lossless ingress traffic (e.g., the minimum value for the lossless buffers is 5 percent). Lossless headroom buffers may represent a percentage of the shared buffer pool for packets received while a pause is asserted. For example, if Ethernet "PAUSE" is configured on a port/networking device or if priority-based flow control (PFC) is configured on priorities on a port/networking device, when the port/networking device sends a pause message to a connected peer, the port/networking device uses the headroom buffers to store the packets that arrive between the time the port/networking device sends the pause message and the time the last packet arrives after the peer pauses traffic. In some cases, the minimum value for the lossless headroom buffers is 0 (zero) percent (e.g., lossless headroom buffers are the only buffers that can have a minimum value of less than 5 percent). Lossy buffers may represent a percentage of the shared buffer pool for all best-effort ingress traffic (e.g., best-effort unicast, multidestination, and strict-high priority traffic). The minimum value for the lossy buffers is 5 percent. Unlike lossless buffers or queues, lossy buffers or queues may not include a headroom buffer.

In some embodiments, a buffer configuration is applied in order to provide lossless services and to ensure fairness between networking device (e.g., ports) and priorities. The buffer mechanism allows defining reserved memory allocation and limiting the usage of memory based on incoming/outgoing ports and a priority of the packet. In addition, the buffer can be divided into static pools, each for a specific set of priorities. Buffer configuration mechanism allows fair enforcement from both ingress and egress sides.

Shared buffer properties or shared buffer parameters can be used to configure how much of a total shared buffer a port or networking device is allocated. Allocation may be made from a port or on a per-port basis. In some embodiments, queue allocation can be provided as a portion on a shared buffer or a portion relative to a shared buffer based on real-time availability. Shared buffer properties or shared buffer parameters can also be used to configure how fast a port or networking device consumes its allocated portion of the shared buffer. Usually, a single port or networking device is restricted in this sense. With respect to all-to-all communications, with a known total size being smaller than the shared buffer, it can be assumed that the shared buffer will not overflow.

In some cases, shared buffer properties or shared buffer parameters may be configured statically to a port or networking device of a distributed computing environment or network. However, the traffic flowing through the ports or networking devices may vary with regards to size and burstiness, such that the statically configured properties or parameters may be inefficient. For example, the configured properties or parameters may limit an amount of the shared buffer that can be used or accessed by a networking device at a given time, where the shared buffer could have otherwise been used to process or transfer data/packets by the networking device.

Accordingly, to provide on-the-fly allocation of buffer resources (e.g., shared buffer resources), devices, systems, and methods are provided herein that takes advantage of a central accounting capabilities (e.g., for physical queues and/or virtual queues). Once a queue is formed (e.g., physical or virtual) for a packet flow, a system may measure bandwidth (e.g., ingress and egress in bytes). With the measured bandwidth, the system may apply a mice/elephant flow state to the packet flow. For example, the system may apply the "mice" flow state to applications across the fabric that are working in a burstiness (e.g., small, fast packet flows, which can be latency sensitive), and the system may apply the "elephant" flow state to other applications that work with big flows (e.g., large sized packets flowing from one point to another in a distributed computing environment or network).

If a packet flow is identified as including an "elephant" flow state, the system may determine that the shared buffer can absorb burstiness if there is congestion on the egress. Accordingly, on a per-quota basis, the system may distinguish a packet flow as including a "mice" or "elephant" flow state. If the packet flow is determined to have an "elephant" flow state, then the system may apply one type of shared buffer scheme to the packet flow. If the packet flow is determined to have a "mice" flow state, then the system may apply a different shared buffer scheme to the packet flow. For example, based on the mice/elephant distinguishment, the system may adjust the shared buffer scheme (e.g., change attribute(s)) per flow as a packet flow is assigned the elephant or mice distinguishment. Additionally, the system may attribute the mice/elephant distinguishment to an ingress and/or egress quota. In some embodiments, the system may adjust (e.g., on the fly) a service class of the queue as well as the shared buffer scheme.

FIG. 1 illustrates a system 100 according to at least one example embodiment. The system 100 includes a networking device 104, a communication network 108, and a networking device 112. In at least one example embodiment, networking devices 104 and 112 may correspond a network switch (e.g., an Ethernet switch), a collection of network switches, a NIC, or any other suitable device used to control the flow of data between devices connected to communication network 108. Each networking device 104 and 112 may be connected to one or more of Personal Computer (PC), a laptop, a tablet, a smartphone, a server, a collection of servers, or the like. In one specific, but non-limiting example, each networking device 104 and 112 includes multiple network switches in a fixed configuration or in a modular configuration.

Examples of the communication network 108 that may be used to connect the networking devices 104 and 112 include an Internet Protocol (IP) network, an Ethernet network, an InfiniBand (IB) network, a direct GPU-to-GPU or similar wire-based serial multi-lane communication link (e.g., NVLink), a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the networking devices 104 and 112 using Ethernet technology. In one specific, but non-limiting example, the networking devices 104 and 112 correspond to director switches that may have a modular configuration. As discussed in more detail below, a network switch (e.g., a director switch) according to inventive concepts may implement multiple layers of a network topology as field replaceable units (FRUs) or customer replaceable units (CRUs) within a single chassis.

Although not explicitly shown, the networking device 104 and/or the networking device 112 may include storage devices and/or processing circuitry for carrying out computing tasks, for example, tasks associated with controlling the flow of data within each networking device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, RAM, Read-Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a PCB or collection of PCBs. It should be appreciated that any appropriate type of electrical component or collection of electrical components may be suitable for inclusion in the processing circuitry.

In addition, although not explicitly shown, it should be appreciated that the networking devices 104 and 112 include one or more communication interfaces for facilitating wired and/or wireless communication between one another and other unillustrated elements of the system 100.

In some embodiments, the networking devices 104 and 112 may include flow controllers 116 and 120, respectively. For example, the flow controllers 116, 120 may be integrated into the networking devices 104, 112. The flow controllers 116 and 120 may be used, in part, to provide or enable access to a shared buffer 124 for the networking devices 104 and 112 (e.g., provide admission to the shared buffer 124). As described previously, the shared buffer 124 may represent a pool of buffer space (e.g., shared memory space) that the system 100 can allocate dynamically across all of the corresponding networking devices (e.g., ports, applications, nodes, etc.) as memory space is needed.

As described herein, the networking devices 104, 112 may employ the flow controllers 116, 120 to provide on-the-fly allocation of buffer resources (e.g., resources of the shared buffer 124). For example, the flow controllers 116, 120 may measure a packet flow's bandwidth consumption (e.g., measured in bytes) of the shared buffer 124 in and/or out (e.g., ingress and/or egress) of the networking devices 104 and 112. A flow's bandwidth measurement can be made on top of a shared-buffer resource allocation. The flow can be mapped to a physical queue or virtual queue that consumes resources of the shared buffer 124. Based on the packet flow's bandwidth consumption of the shared buffer 124, the flow controllers 116 and 120 may assign a flow-type attribute to the packet flow and then may select a shared buffer schema for the packet flow based on the flow-type attribute assigned to the packet flow. Subsequently, the flow controllers 116 and 120 may apply the selected shared buffer schema to the packet flow.

That is, once a queue is formed (e.g., physical or virtual) for a packet flow, the flow controllers 116, 120 may measure bandwidth (e.g., ingress and egress in bytes). With the measured bandwidth, the flow controllers 116, 120 may apply a mice/elephant flow state to the packet flow. For example, the flow controllers 116, 120 may apply the "mice" flow state to applications across the fabric that are working in a burstiness (e.g., small, fast packet flows), and the flow controllers 116, 120 may apply the "elephant" flow state to other applications that work with big flows (e.g., large sized packets flowing from one point to another in a distributed computing environment or network). In some embodiments, the "mice" flow state may be assigned to the packet flow when the packet flow exhibits a first amount of burstiness, and the "elephant" flow state may be assigned to the packet flow when the packet flow exhibits a second amount of burstiness that is less than the first amount of burstiness.

If a packet flow is identified with an "elephant" flow state, the system 100 may determine that the shared buffer can absorb burstiness if there is congestion on the egress. Accordingly, on a per-quota basis, the system 100 may distinguish a packet flow as having a "mice" or "elephant" flow state. If the packet flow is determined to have an "elephant" flow state, then the system 100 may apply one type of shared buffer scheme to the packet flow. If the packet flow is determined to have a "mice" flow state, then the system 100 may apply a different shared buffer scheme to the packet flow. For example, based on the mice/elephant distinguishment, the system 100 may adjust the shared buffer scheme (e.g., change attribute(s)) per flow as a packet flow is assigned the elephant or mice distinguishment. In some embodiments, the packet flow may be assigned a first amount of reserved buffer when the packet flow is assigned the "mice" flow state as the flow-type attribute, and the packet flow may be assigned a second amount of reserved buffer when the packet flow is assigned the "elephant" flow state as the flow-type attribute. The reserved amount of the reserved buffer may not only be statically adjusted but also or alternatively dynamically adjusted (e.g., based on the packet flow being assigned the "mice" flow state or the "elephant" flow state).

Additionally, the system 100 may attribute the mice/elephant distinguishment to an ingress and/or egress quota. In some embodiments, the system 100 may adjust (e.g., on the fly) a service class of the queue as well as the shared buffer scheme. In some embodiments, when measuring the packet flow's bandwidth consumption of the shared buffer 124 in and/or out (e.g., ingress and/or egress) of the networking devices 104 and 112, the flow controllers 116, 120 may measure the bandwidth consumption of a physical queue (e.g., a queue stored in a fixed memory location in hardware of the networking devices 104, 112), a virtual queue (e.g., a queue stored in software that points at a location in the physical memory of the networking devices 104, 112), or both. In effect, the flow-type generated or assigned to the packet flow (e.g., "mice" or "elephant") may affect a shared-buffer schema of the physical and/or virtual queue. Additionally, the flow controllers 116, 120 may adjust a service class of the at least one of the physical queue and the virtual queue.

In some embodiments, the networking devices 104, 112 may include multiple quotas (e.g., several thousand quotas). The system 100 may bind a packet flow to an individual quota. Each quota may represent a maximum number for a particular type of resource that can be created or used for a packet flow, if that resource is available (e.g., a quota may limit a number of available resources). In some embodiments, a default quota could be enforced for all packet flows. In a networking default quota mechanism, all projects or packet flows may have same quota values, such as the number of resources that a project can create.

In some embodiments, an admission schema for the packet flow to access or use the shared buffer 124 may include different TailDrop thresholds if the packet flow and corresponding quota is assigned the "mice" flow state or the "elephant" flow state (e.g., TailDrop may represent a policy which admits a packet into the shared buffer whenever there is available space.) Additionally or alternatively, an admission schema for the packet flow to access or use the shared buffer 124 may include different shared-buffer schemas, lossy schemas, lossless schemas, lossless headroom buffers, etc., if the packet flow and corresponding quota is assigned the "mice" flow state or the "elephant" flow state.

In some embodiments, an "alpha" attribute may be assigned to the packet flow based on the packet flow being assigned the "mice" flow state or the "elephant" flow state. For example, an "alpha" attribute may represent a scalar attribute that shrinks/expands based on the number of free resources (e.g., kilobytes (kB), megabytes (MB), etc.) from the shared buffer 124. In some embodiments, the "alpha" attribute may represent a priority. Each quota sees a same free space based on availability. The bandwidth measurements of the ingress/egress described previously may affect the "alpha" attribute (i.e., change it). If the packet flow is assigned the "mice" flow state (e.g., the packet flow does not consume a lot of bandwidth but includes lots of spikes or burstiness), then the packet flow may include an "alpha" attribute that is low/small. This low/small "alpha" attribute may mean the corresponding quota would not be allowed to use a higher number of resources from the shared buffer 124. If a flow is assigned the "elephant" flow state (e.g., the packet flow consumes a high amount of bandwidth, has low levels of burstiness, or both), then the packet flow may include a higher "alpha" attribute.

Additionally or alternatively, a "reserve" attribute of a packet flow may be assigned based on the packet flow being assigned the "mice" flow state or the "elephant" flow state. For example, the "reserve" attribute may represent a reserved number of resources (e.g., dedicated resources) for processing and/or forwarding the packet flow. If the packet flow is assigned the "mice" flow state, the corresponding quota and packet flow may receive a smaller portion of the reserved resources. If the packet flow is assigned the "elephant" flow state, the corresponding quota and packet flow may receive more of the reserved resources. In some embodiments, a quota may retain distinct attributes (e.g., "alpha" attribute, "reserve" attribute, etc.) for a packet flow based on the packet flow being assigned the "mice" flow state or the "elephant" flow state.

Accordingly, based on the techniques described herein, a shared-Buffer admission schema is provided that is aware of a type of flow state (e.g., "mice" flow state or the "elephant" flow state) for a packet flow. Additionally, a distinct admissions schema for packet forwarding may also be based on the packet flow being assigned the "mice" flow state or the "elephant" flow state. Even if a packet flow has the same forwarding attributes and passes thorough the same quotas, a control processing (e.g., control plan) may have a distinct and different admission schema for a packet flow based on the packet flow being assigned "mice" flow state or the "elephant" flow state. Moreover, as the flow controllers 116, 120 can measure bandwidth per quota in shared-buffer accounting (e.g., per packet flow), a "mice" or "elephant" curve can be applied to each quota, such that each quota can have a "mice" or "elephant" state. Additionally, the "mice" or "elephant" state may be applied to other techniques (e.g., FlexQuota). In some embodiments, based on the techniques described herein, a distinct shared-buffer schema may be applied per quota based on the corresponding packet flow, the quota, the "mice" or "elephant" state, or a combination thereof. Additionally, visibility shared-buffer attributes (e.g., cause, histograms, etc.) may be based on the "mice" or "elephant" flow state being assigned to the packet flow.

Figure 2:
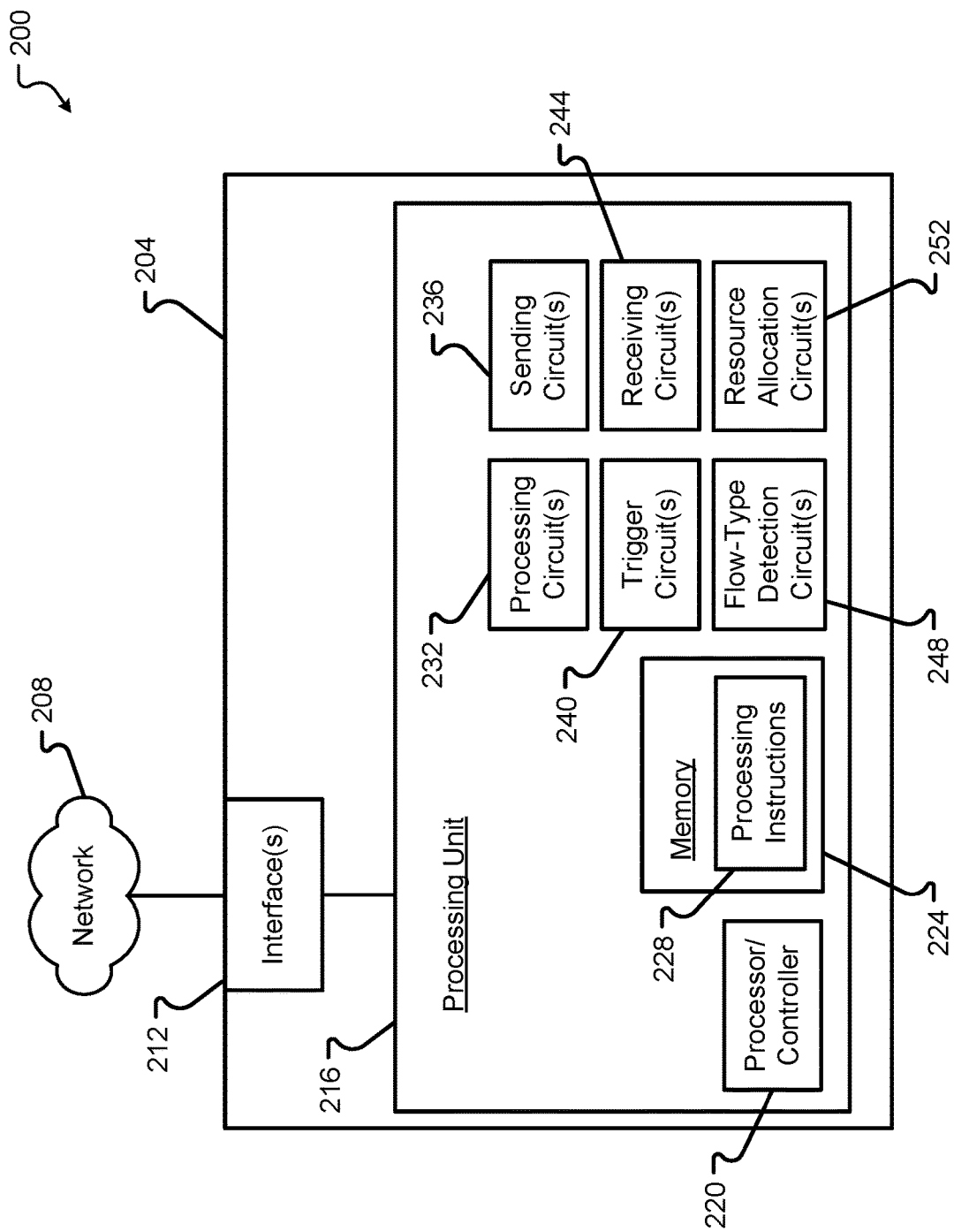
FIG. 2 is a block diagram illustrating a device in accordance with at least some embodiments of the present disclosure.

Referring now to FIG. 2, additional details of a device 204 that may be configured to contribute to the collective will be described in accordance with at least some embodiments of the present disclosure. The device 204 may correspond to a networking device 104, 112 and/or the flow controllers 116, 120 as described with reference to FIG. 1 (e.g., network element, network device, process, etc.). Non-limiting examples of a device 204 include, without limitation, a switch, a server, a Network Interface Controller (NIC), an interface card, a Personal Computer (PC), a router, or the like. The device 204 is shown to be connected with a network 208 via a network interface 212. The device 204 is also shown to include a processing unit 216, which may include a processor 220, memory 224, and one or more circuits. The one or more circuits may be configured to perform functions in connection with executing a collective operation. Non-limiting examples of circuits that may be included in the device 204 are processing circuit(s) 232, sending circuit(s) 236, trigger circuit(s) 240, receiving circuit(s) 244, flow-type detection circuit(s) 248, and resource allocation circuit(s) 252. The memory 224 is shown to include processing instructions 228, which may facilitate similar behavior as the processing circuit(s) 232 when executed by the processor 220.

The processing unit 216 may be configured to perform data processing functions for the device 204. As an example, the processing unit 216 in the form of a Central Processing Unit (CPU), Graphics Processing Unit (GPU), or Data Processing Unit (DPU), which may enable the device 204 to join a collective, communicate among members of the collective, process data according to the collective operation, etc.

The device interface 212 may connect with the communication network 208 via a communication link. The communication link may include a wired connection, a wireless connection, an electrical connection, etc. In some embodiments, the communication link may facilitate the transmission of data packets between the other devices connected to the network 208. Other members of a collective (e.g., other endpoints 104) may also be connected to the network 208. It should be appreciated that the communication link established between the interface 212 and the network 208 may include, without limitation, a PCIe link, a Compute Express Link (CXL) link, a high-speed direct GPU-to-GPU link (e.g., an NVlink), etc.

The memory 224 may include instructions 228 for execution by the processor 220 that, when executed by the processor 220, enable the processing unit 216 to perform any number of tasks (e.g., data routing tasks, data processing tasks, data aggregation tasks, data sending tasks, etc.). Alternatively or additionally, the processing unit 216 may utilize the one or more circuits to implement functionality of device 204. In some embodiments, the processing circuit(s) 232 may be configured to receive and process data as part of the collective operation. Processes that may be performed by the processing circuit(s) 232 include, without limitation, arithmetic operations, data reformatting operations, Boolean operations, etc.

The sending circuit(s) 236 may be configured to send an output of the processing circuit(s) 232 to other members/processes of the collective. As an example, the processing circuits(s) 232 may generate one or more outputs that are transmitted via the interface 212 to another endpoint of the collective (e.g., the networking devices 104, 112 of the system 100). The sending circuit(s) 236 may be configured to format outputs of the processing circuit(s) 232 for transmission by the interface 212. The sending circuit(s) 236 may also be configured to operate or format data according to a communication protocol used within the network 208.

The trigger circuit(s) 240 may be configured to initiate operation of the processing circuit(s) 232. For instance, the trigger circuit(s) 240 may be configured to reference outputs of the response circuit(s) 248 and provide a signal to the processing circuit(s) 232 that causes the processing circuit(s) 232 to begin processing data as part of the collective operation based on the outputs of the response circuit(s) 248. Thus, the trigger circuit(s) 240 may be considered an initiator for the processing circuit(s) 232.

The receiving circuit(s) 244 may be similar to the sending circuit(s) 236 in that the receiving circuit(s) 244 may be configured to operate in connection with the interface 212. In some embodiments, the receiving circuit(s) 244 may be configured to receive output(s) (e.g., output data) from one or more nodes/endpoints in a collective and format the output(s) for processing by the processing circuit(s) 232. In some embodiments, the receiving circuit(s) 244 may be configured to receive data from other endpoints in the collective and/or from the device 204 itself. In particular, as described herein, the receiving circuit(s) 244 (e.g., receiver circuits) may receive a packet flow.

The flow-type detection circuit(s) 248 may be configured to classify the packet flow between a mice flow state and an elephant flow state. For example, the mice flow state may be assigned to the packet flow when the packet flow exhibits a first amount of burstiness, and the elephant flow state may be assigned to the packet flow when the packet flow exhibits a second amount of burstiness that is less than the first amount of burstiness. In some embodiments, the flow-type detection circuit(s) 248 may classify the packet flow based on a measured bandwidth consumed by the packet flow. Additionally, the bandwidth consumed by the packet flow may be measured at an ingress and/or egress of a buffer and/or a queue (e.g., a physical queue, a virtual queue, or both). In some embodiments, the bandwidth consumption of the packet flow is measured in bytes.

The resource allocation circuit(s) 252 may be configured to assign a resource allocation schema to the packet flow based on the classification assigned to the packet flow by the flow-type detection circuit(s) 248. For example, the resource allocation schema may comprise a shared-buffer schema, a lossy schema, a lossless schema, or a combination thereof. In some embodiments, a different amount of reserved buffer may be made available to the packet flow depending upon the classification assigned to the packet flow by the flow-type detection circuit(s) 248. For example, the packet flow may be allocated a smaller portion of the reserved buffer when classified with the mice flow state than would be allocated to the packet flow when classified with the elephant flow state.

The processor 220 and/or various circuit(s) described above may include one or more Integrated Circuit (IC) chips, microprocessors, circuit boards, simple analog circuit components (e.g., resistors, capacitors, inductors, etc.), digital circuit components (e.g., transistors, logic gates, etc.), registers, Field Programmable Gate Arrays (FPGAs), Application Specific Integrated Circuits (ASICs), combinations thereof, and the like. It should be appreciated that the processor 220 may correspond to an optional component of the processing unit 216, especially in instances where the circuit(s) provide sufficient functionality to support operations of the processing unit 216 described herein. As noted above, the processing unit 216 may correspond to a CPU, GPU, DPU, combinations thereof, and the like. Thus, while only a single processing unit 216 is shown in the device 204, it should be appreciated that the device 204 may include multiple processing units 216 without departing from the scope of the present disclosure.

The memory 224 may include any number of types of memory devices. As an example, the memory 224 may include Random Access Memory (RAM), Read Only Memory (ROM), flash memory, Electronically-Erasable Programmable ROM (EEPROM), Dynamic RAM (DRAM), buffer memory, combinations thereof, and the like.

Figure 3:
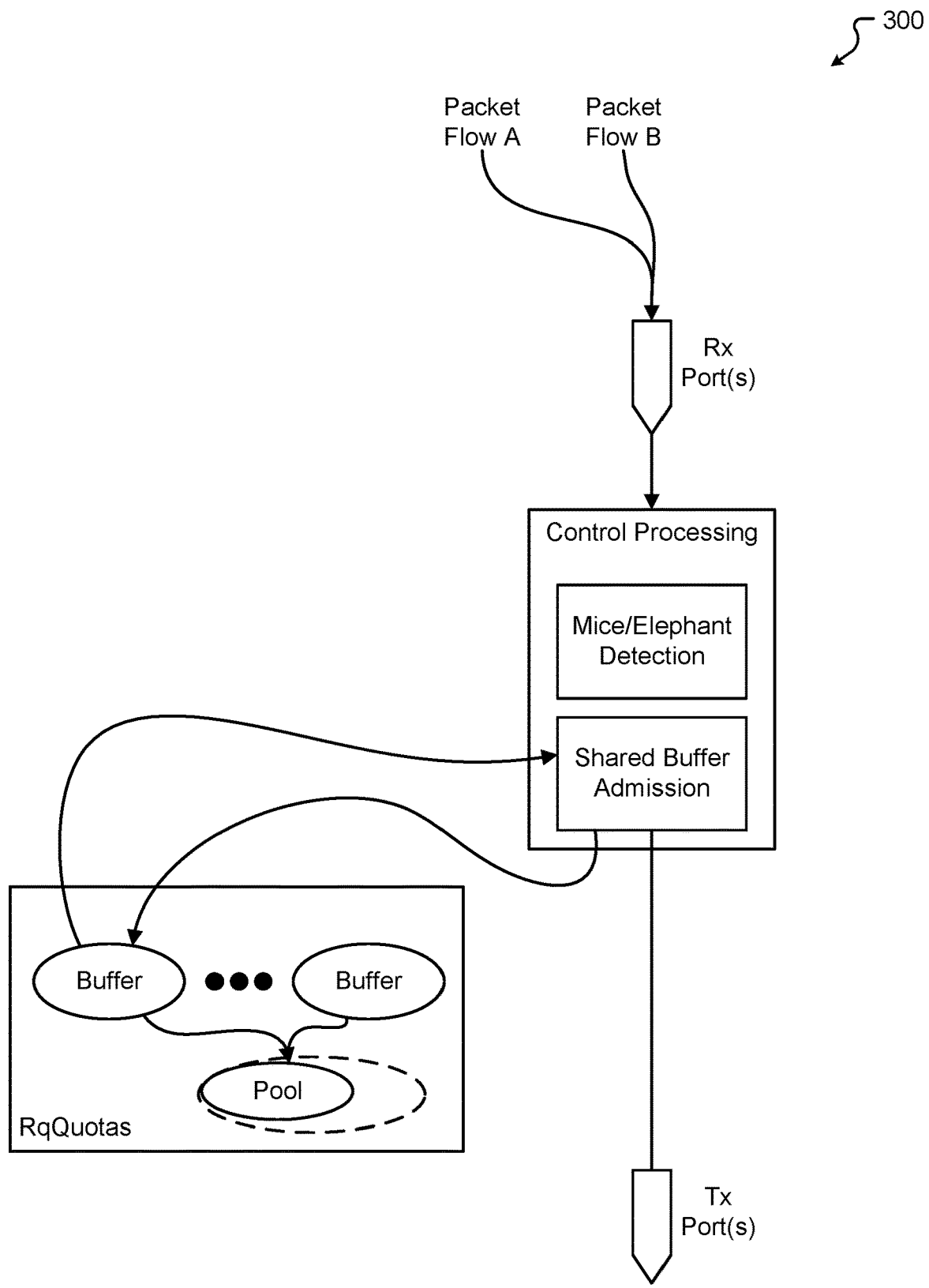
FIG. 3 illustrates an example of a system for applying a shared buffer schema according to at least one example embodiment of the present disclosure.
Figure 4:
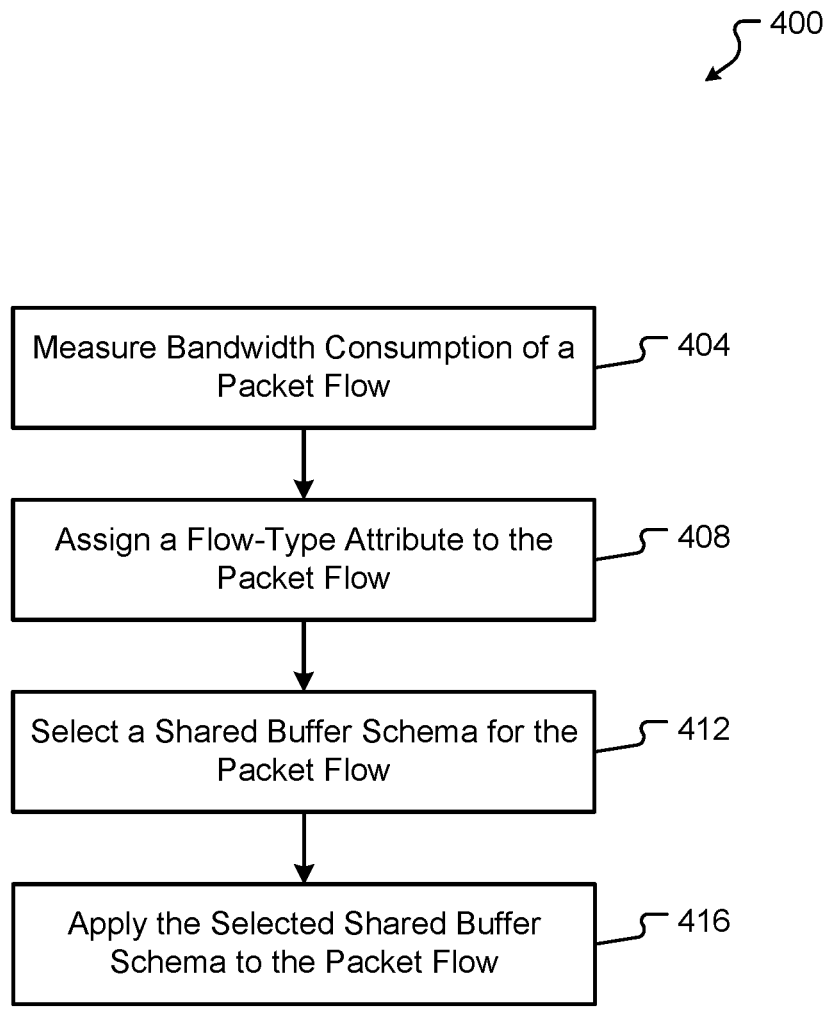
FIG. 4 illustrates a flowchart according to at least one embodiment of the present disclosure.

Referring now to FIGS. 3-4, additional details regarding operations of components in the system 100 will be described. While certain steps of the methods will be described as being performed in a particular order and by a particular component, it should be appreciated that embodiments of the present disclosure are not so limited. Specifically, the order of operations in the various methods may be modified and any component or combination of components in the system 100 may be configured to perform some or all of the method steps depicted and described herein.

FIG. 3 illustrates an example of a system 300 configured for providing admission to a shared buffer for a packet flow (e.g., a shared-buffer admission schema) based on the packet flow being assigned a flow-type attribute (e.g., a "mice" flow state or an "elephant" flow state) as described herein. For example, a first packet flow (e.g., packet flow A) and a second packet flow (e.g., packet flow B) may be received at receiving port(s) and/or receiving circuit(s) (e.g., of a same or different networking devices). The packet flows may then be processed (e.g., through a type of control processing) to detect whether the packet flows should be assigned a "mice" flow state or an "elephant" flow state as described previously. The packet flows may then be admitted to a shared buffer based on the assigned flow state (e.g., with distinct attributes, such as "reserve" and "alpha" attributes; distinct admission schemas for processing; distinct admission schemas for packet forwarding; distinct visibility shared-buffer attributes; etc., that are based on the assigned "mice" or "elephant" flow state). As resources become available for processing or forwarding the packet flows, the packet flows may then be sent via transmission port(s) and/or sending circuit(s) (e.g., of a same or different networking devices).

FIG. 4 depicts a method 400 that may be used, for example, to optimize a workflow at a networking device by bypassing a congestion controller for smaller sized data flows.

The method 400 (and/or one or more steps thereof) may be carried out or otherwise performed, for example, by at least one processor. The at least one processor may be the same as or similar to the processor(s) of the networking device 104, 112 or 204 described above. The at least one processor may be part of the networking device 204 or part of a control unit in communication with the networking device 104, 112, or 204. A processor other than any processor described herein may also be used to execute the method 400. The at least one processor may perform the method 400 by executing elements stored in a memory (such as a memory in the networking device 104, 112, or 204 as described above or a control unit). The elements stored in the memory and executed by the processor may cause the processor to execute one or more steps of a function as shown in method 400. One or more portions of a method 400 may be performed by the processor executing any of the contents of memory, such as analyze one or more packets received at the networking device 104, 112, or 204 and/or any associated operations as described herein.

The method 400 comprises measuring bandwidth consumption of a packet flow (step 404). For example, the bandwidth consumption of the packet flow maybe measured at an ingress of a queue. Additionally or alternatively, the bandwidth consumption of the packet flow may be measured at an egress of a queue. In some embodiments, the bandwidth consumption of the packet flow may be measured for at least one of a physical queue or a virtual queue. Additionally, the bandwidth consumption of the packet flow may be measured in bytes.

The method 400 also comprises assigning a flow-type attribute to the packet flow based on the bandwidth consumption of the packet flow (step 408). For example, the flow-type attribute assigned to the packet flow may comprise a mice flow state or an elephant flow state, and a reserve attribute may be assigned to the flow based on the packet flow being assigned the mice flow state or the elephant flow state. In some embodiments, the packet flow may be assigned a first amount of reserved buffer when the packet flow is assigned the mice flow state as the flow-type attribute, and the packet flow may be assigned a second amount of reserved buffer when the packet flow is assigned the elephant flow state as the flow-type attribute.

The method 400 also comprises selecting a shared buffer schema for the packet flow based on the flow-type attribute assigned to the packet flow (step 412). The method 400 also comprises applying the selected shared buffer schema to the packet flow (step 416). In some embodiments, a service class of the at least one of the physical queue and the virtual queue may also be adjusted.

The present disclosure encompasses embodiments of the method 400 that comprise more or fewer steps than those described above, and/or one or more steps that are different than the steps described above.

As noted above, the present disclosure encompasses methods with fewer than all of the steps identified in FIG. 4 (and the corresponding description of the method 400), as well as methods that include additional steps beyond those identified in FIG. 4 (and the corresponding description of the method 400). The present disclosure also encompasses methods that comprise one or more steps from one method described herein, and one or more steps from another method described herein. Any correlation described herein may be or comprise a registration or any other correlation.

Any of the steps, functions, and operations discussed herein can be performed continuously and automatically.

The exemplary systems and methods of this disclosure have been described in relation to a dual connect switch module. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

What is claimed is:

1. A system, comprising:
   a processor; and
   computer memory coupled to the processor, wherein the computer memory comprises instructions stored thereon that, when executed by the processor, enable the processor to:
   measure bandwidth consumption of a packet flow within a distributed computing environment, wherein the bandwidth consumption is measured on a per-quota basis;
   based on the bandwidth consumption of the packet flow, assign a flow-type attribute and a corresponding quota to the packet flow, wherein the flow-type attribute assigned to the packet flow comprises a mice flow state or an elephant flow state, wherein a reserve attribute is assigned to the flow based on the packet flow being assigned the mice flow state or the elephant flow state, wherein the reserve attribute represents a reserved number of resources for processing and/or forwarding the packet flow, and wherein the corresponding quota retains the reserve attribute for the packet flow;
   apply an admission schema for the packet flow to access one or more buffer resources shared among multiple devices in the distributed computing environment;
   contingent upon the packet flow satisfying the admission schema, select a shared buffer schema for the packet flow based on the flow-type attribute assigned to the packet flow, wherein the shared buffer schema is applied to the one or more buffer resources shared among multiple devices in the distributed computing environment; and
   apply the selected shared buffer schema to the packet flow.

2. The system of claim 1, wherein the instructions, when executed by the processor, further enable the processor to:
   measure the bandwidth consumption of the packet flow at an ingress of a queue.

3. The system of claim 1, wherein the instructions, when executed by the processor, further enable the processor to:
   measure the bandwidth consumption of the packet flow at an egress of a queue.

4. The system of claim 1, wherein the bandwidth consumption of the packet flow is measured for at least one of a physical queue or a virtual queue.

5. The system of claim 4, wherein the bandwidth consumption of the packet flow is measured in bytes.

6. The system of claim 4, wherein the instructions, when executed by the processor, further enable the processor to:
   adjust a service class of the at least one of the physical queue and the virtual queue.

7. The system of claim 1, wherein the reserved number of resources for processing and/or forwarding the packet flow correspond to one or more resources dedicated to the packet flow.

8. The system of claim 7, wherein the packet flow is assigned a first amount of a reserved buffer when the packet flow is assigned the mice flow state as the flow-type attribute and wherein the packet flow is assigned a second amount of the reserved buffer when the packet flow is assigned the elephant flow state as the flow-type attribute.

9. The system of claim 8, wherein the mice flow state is assigned to the packet flow when the packet flow exhibits a first amount of burstiness and wherein the elephant flow state is assigned to the packet flow when the packet flow exhibits a second amount of burstiness that is less than the first amount of burstiness.

10. A flow controller, comprising:
    one or more receiver circuits that receive a packet flow within a distributed computing environment;
    one or more flow-type detection circuits that classify the packet flow and a corresponding quota between a mice flow state and an elephant flow state; and
    one or more resource allocation circuits that assign a resource allocation schema to the packet flow based on the classification assigned to the packet flow by the one or more flow-type detection circuits and based upon the packet flow satisfying an admission schema for the packet flow to access one or more buffer resources shared among multiple devices in the distributed computing environment, wherein a reserve attribute is assigned to the packet flow based on the packet flow being assigned the mice flow state or the elephant flow state, wherein the reserve attribute represents a reserved number of resources for processing and/or forwarding the packet flow, and wherein the corresponding quota retains the reserve attribute for the packet flow.

11. The flow controller of claim 10, wherein the resource allocation schema further comprises a lossy schema, a lossless schema, or a combination thereof.

12. The flow controller of claim 11, wherein a different amount of reserved buffer is made available to the packet flow depending upon the classification assigned to the packet flow by the one or more flow-type detection circuits.

13. The flow controller of claim 12, wherein the packet flow is allocated a smaller portion of the reserved buffer when classified with the mice flow state than would be allocated to the packet flow when classified with the elephant flow state.

14. The flow controller of claim 13, wherein the mice flow state is assigned to the packet flow when the packet flow exhibits a first amount of burstiness and wherein the elephant flow state is assigned to the packet flow when the packet flow exhibits a second amount of burstiness that is less than the first amount of burstiness.

15. The flow controller of claim 10, wherein the one or more flow-type detection circuits classify the packet flow based on a measured bandwidth consumed by the packet flow.

16. The flow controller of claim 15, wherein the bandwidth consumed by the packet flow is measured at an ingress and/or egress of a buffer.

17. A system, comprising:
    a shared buffer that comprises buffer resources shared among a plurality of devices in a distributed computing environment; and
    a flow controller that:
    measures a packet flow's bandwidth consumption of the shared buffer on a per-quota basis;
    based on the packet flow's bandwidth consumption of the shared buffer, assigns a flow-type attribute and a corresponding quota to the packet flow, wherein the flow-type attribute assigned to the packet flow comprises a mice flow state or an elephant flow state, wherein a reserve attribute is assigned to the flow based on the packet flow being assigned the mice flow state or the elephant flow state, wherein the reserve attribute represents a reserved number of resources for processing and/or forwarding the packet flow, and wherein the corresponding quota retains the reserve attribute for the packet flow;

applies an admission schema for the packet flow to access one or more buffer resources shared among multiple resource sin the distributed computing environment;

selects a shared buffer schema for the packet flow based on the flow-type attribute assigned to the packet flow and contingent upon the packet flow satisfying the admission schema; and applies the selected shared buffer schema to the packet flow thereby adjusting an amount of the buffer resources from the shared buffer that are made available to the packet flow.

18. The system of claim 17, wherein the flow controller measures the packet flow's bandwidth consumption at one or both of a queue ingress and a queue egress.

19. The system of claim 18, wherein the queue comprises at least one of a physical queue or a virtual queue.

20. The system of claim 17, wherein the reserved number of resources for processing and/or forwarding the packet flow correspond to one or more resources dedicated to the packet flow.

* * * * *